United States Patent [19]

House et al.

[11] Patent Number: 5,312,886
[45] Date of Patent: May 17, 1994

[54] BIS(N-ALKYLAMINOCYCLOHEXYL)METHANES AS CURING AGENTS FOR POLYURETHANES AND POLYUREAS

[75] Inventors: David W. House, Arlington Heights; Ray V. Scott, Jr., Schaumburg; Mark J. Gattuso, Palatine, all of Ill.

[73] Assignee: UOP, Des Plaines, Ill.

[21] Appl. No.: 122,946

[22] Filed: Sep. 20, 1993

[51] Int. Cl.$^5$ .............................................. C08G 18/10
[52] U.S. Cl. ...................................... 528/64; 528/67; 528/68; 528/85
[58] Field of Search ................. 528/64, 67, 68, 85; 564/452

[56] References Cited

U.S. PATENT DOCUMENTS

| | | | |
|---|---|---|---|
| 3,600,358 | 8/1971 | Taub | 528/64 |
| 5,204,439 | 4/1993 | Dornish et al. | 528/64 |
| 5,218,040 | 6/1993 | Gras et al. | 528/64 |

Primary Examiner—Maurice J. Welsh
Attorney, Agent, or Firm—Thomas K. McBride; Eugene I. Snyder

[57] ABSTRACT

Bis(N-alkylaminocyclohexyl)methanes are excellent chain extenders in the formation of polyurethane and polyurea polymers, both elastomers and coatings, from both monomeric polyisocyanates and isocyanate-terminated prepolymers. Our chain extenders may be used alone or in combination with other polyamines and with polyols. A broad spectrum of polymeric material can be formed with a range of diverse properties.

26 Claims, No Drawings

BIS(N-ALKYLAMINOCYCLOHEXYL)METHANES AS CURING AGENTS FOR POLYURETHANES AND POLYUREAS

BACKGROUND OF THE INVENTION

As a subclass of commercially available polymers, polyurethane elastomers have several properties whose advantages confer unique benefits on them. Typically, polyurethanes and the related polyureas show high abrasion resistance with high load bearing, excellent cut and tear resistance, high hardness, and resistance to ozone degradation, yet are portable and castable. Compared to metals, polyurethanes are lighter in weight, less noisy in use, show better wear and excellent corrosion resistance while being capable of less expensive fabrication. Compared to other plastics, polyurethanes are non-brittle, much more resistant to abrasion, and exhibit good elastomeric memory. Polyurethanes find use in such diverse products as aircraft hitches, bushings, cans, gaskets, star wheels, washers, scraper blades, impellers, gears, and also serve as coatings in a wide variety of uses.

Part of the utility of polyurethanes (and polyureas) derives from their enormous diversity of properties resulting from a relatively limited number of reactants. Typically, polyurethanes are prepared on site by reacting (curing) the terminal isocyanate groups of a monomeric polyisocyanate or of a low molecular weight prepolymer with the isocyanate-reactive hydrogens of a polyfunctional compound so as to form high polymers through chain extension and, in some cases, crosslinking. Urethane prepolymers are adducts of polyisocyanates and polyhydric alcohols as exemplified by the 2:1 adducts of a diisocyanate and a diol, and urea prepolymers are adducts of monomeric polyisocyanates and polyamines. Diols, and especially alkylene diols, are the most common isocyanate-reactive materials used as curing agents and lead to linear polymers by chain extension. Where a triol or a higher polyhydric alcohol is used crosslinking occurs to afford a non-linear polymer. Although other polyfunctional materials, especially diamines, are theoretically suitable, with but a few exceptions none have achieved commercial importance as a curing agent. The major exceptions are 4,4'-methylene-di-ortho-chloroanaline, usually referred to as MOCA, and the 2,4- and 2,6-diamino-3,5-diethyl-1-methylbenzene, often referred to as diethyltoluene diamine or DETDA, curing agents which are both a chain extender and a crosslinker. More recently selected secondary diamines and polyamines have found favor as curing agents. The secondary diamines act solely as chain extenders.

Among the unsatisfied needs in the polyurethane and polyurea elastomer field is that for a product which shows excellent light stability while having the toughness of polymers made using amine-based curing agents. A disadvantage of many current products is their tendency to yellow in sunlight, whereas it would be highly advantageous to have products which show no darkening with time for particular applications such as coatings generally, elastomers such as topcoats for automobiles and outdoor implements, for roofs, coatings for bridges and decks, and for certain adhesives.

SUMMARY OF THE INVENTION

A purpose of our invention is to provide diamines which may be used as chain extenders to provide light-stable polymers of the polyurethane and polyurea types. An embodiment comprises diamines of the classes bis(4-alkylaminocyclohexyl)methane and bis(4-alkylamino-3-alkylcyclohexyl)methane, where the alkyl groups are lower alkyls of not more than 10 carbons when bonded to nitrogen and not more than 5 carbons when bonded to the cyclohexyl ring. In a specific embodiment the diamine is bis(4-sec-butylaminocyclohexyl)methane. In another specific embodiment the diamine is bis(4-sec-butyl-3-methylcyclohexyl)methane. Another embodiment consists of the polymers prepared by our chain extenders. Other embodiments and aspects will be clear from the following description.

DESCRIPTION OF THE INVENTION

The subject polymers of this application are the reaction products of one or more polyisocyanate reactants with isocyanate-reactive amines which are bis(N-alkylaminocyclohexyl)methanes and blends of these amines with other isocyanate-reactive materials, principally polyols and other polyamines. (The term "polymer" as used in this application is intended to encompass elastomers and coatings.) Many variants arise because of the distinct combination of reactants which is possible and it will be useful to classify these by type for clarity and ease of understanding.

In one class of variants the polyisocyanate reactant is a monomeric polyisocyanate, which leads to two distinct types of polymer upon reaction with isocyanate-reactive materials. In Type A the monomeric polyisocyanate is reacted only with polyamines as the isocyanate-reactive materials to afford polyureas, characterized by having solely urea linkages. In Type B the monomeric polyisocyanate is reacted with a mixture of polyamines and polyols to afford a polymer with both urea and urethane linkages but generally referred to as polyurethanes because of the presence of urethane groupings. However, it should be clear that the products can range from those having relatively many to those having relatively few urethane linkages even though the Type B variant polymer usually is called a polyurethane.

In another variant the polyisocyanate reactant is a prepolymer, which is an isocyanate-terminated reaction product of a monomeric polyisocyanate with polyamines or polyols. Where 2 equivalents of a monomeric polyisocyanate are reacted with one equivalent of a polyol or polyamine the product is referred to as a "full prepolymer"; where 2 equivalents of a monomeric polyisocyanate are reacted with less than one equivalent of a polyol or polyamine the product is referred to as a "quasi prepolymer". For the purpose of this application, an equivalent of a polyamine or a polyhydric alcohol may be defined as an amount which furnishes as many isocyanate-reactive hydrogen atoms from the amino groups or from the reactive hydroxyl groups as there are isocyanate groups in the polyisocyanate reactant. Conversely, an equivalent of a polyisocyanate is an amount which furnishes as many isocyanate groups as will completely react with the amino and/or hydroxyl hydrogens present. A "full prepolymer" is exemplified by the reaction of two moles of a diisocyanate, OCN—Y—NCO, with one mole of diol, HO—Z—OH,

2
OCN—Y—NCO+HO—Z—OH→OC-
N—Y—NHC(O)OZO(O)CNH—Y—NCO.

Although the isocyanate-terminated prepolymers are represented above ideally as a 2:1 reaction product, more generally they may consist of short polymeric segments arising from further reaction of the above with a polyol.

The prepolymers, whether full or quasi, may be formed from reaction of the monomeric polyisocyanate with either polyols or polyamines, leading to different types of prepolymers, and the various types of prepolymers then can be reacted with the polyamines of this invention either a) alone, b) in combination with polyols, or c) in combination with other polyamines, leading to further diversity. In Type C the prepolymer (full or quasi) results from reaction of a monomeric polyisocyanate with a polyol (referred to as a backbone polyol) to afford urethane linkages. In Type D the prepolymer, full or quasi, results from the reaction of a monomeric polyisocyante with a polyamine (referred to as a backbone polyamine) to afford urea linkages.

Where a Type C prepolymer is subsequently reacted with the chain-extending polyamines of this invention there are formed polymers having both urethane linkages (from the prepolymer) and urea linkages (from the chain extension reaction), but the polymer still is referred to as a polyurethane. Where a type D prepolymer is subsequently reacted with the chain-extending polyamines of this invention, whether or not in combination with other polyamines, the resulting polymer has only urea linkages and the product is clearly a polyurea. Where a type D prepolymer is subsequently reacted with the chain-extending polyamines of this invention in combination with polyols the resulting polymer has both urea linkages and urethane linkages. Whether the elastomer is referred to as a polyurea or a polyurethane is somewhat more problematical depending upon the relative amount of urethane linkages. With this brief but clarifying exposition concluded we now proceed to describe our invention in detail.

In each of the foregoing variants the polyisocyanate reactant, whether a monomer, a prepolymer, or some mixture, is then reacted with the amines of this invention. Since the amines are secondary amines they act only as chain extenders to afford the polymers of this invention. With the possibility of reacting the polyisocyanate reactants with a blend of amines of this invention and polyols comes further diversity depending upon the particular nature of the polyols and the relative amount of polyols in the blend. This is especially true where the polyisocyanate reactant is a monomeric polyisocyanate which is reacted with a polyol-polyamine blend. Yet further diversity results from the reaction of the polyisocyanate reactant with a blend of amines of this invention and other amines.

Among the polyisocyanate reactants used in the practice of this invention are monomeric polyisocyanates which are at least diisocyanates. Examples of such polyisocyanates which may be used in the practice of this invention include phenylene diisocyanate, toluene diisocyanate (TDI), xylene diisocyanate, 1,5-naphthalene diisocyanate, chlorophenylene 2,4-diisocyanate, bitoluene diisocyanate, dianisidine diisocyanate, tolidine diisocyanate and alkylated benzene diisocyanates generally; methylene-interrupted aromatic diisocyanates such as methylene-diphenyl-diisocyanate, especially the 4,4'-isomer (MDI) including alkylated analogs such as 3,3'-dimethyl-4,4'-diphenyl-methane diisocyanate; such hydrogenated materials as cyclohexylene diisocyanate, 4,4'-methylenedicyclohexyl diisocyanate (H12MDI); mixed aralkyl diisocyanates such as the tetramethylxylyl diisocyanates, $OCN-C(CH_3)_2-C_6H_4C(CH_3)_2-NCO$, and the diisocyanate popularly referred to as isophorone diisocyanate, which is 3,3,5-trimethyl-5-isocyanato-methylcyclohexyl isocyanate; and polymethylene isocyanates such as 1,4-tetramethylene diisocyanate, 1,5-pentamethylene diisocyanate, 1,6-hexamethylene diisocyanate (HMDI), 1,7-heptamethylene diisocyanate, 2,2,4- and 2,4,4-trimethylhexamethylene diisocyanate, 1,10-decamethylene diisocyanate and 2-methyl-1,5-pentamethylene diisocyanate.

The polyisocyanate reactant also may be a polyisocyanate prepolymer, which is a reaction product of a monomeric polyisocyanate with up to 0.5 equivalents of compounds having isocyanate-reactive hydrogens, primarily polyols and polyamines. Where the prepolymer is a quasi prepolymer the monomeric polyisocyanate is reacted with from about 0.05–0.49 equivalents of compounds having isocyanate-reactive hydrogens, most typically between about 0.05 and 0.3 equivalents. The polyols used in Type C prepolymer preparation will be referred to as "backbone polyols" and show a wide diversity but otherwise are rather well known and are usually dihydric, with trihydric and higher polyhydric polyols used to a lesser degree. Examples of suitable backbone polyols include ethylene glycol, 1,2-propylene glycol, 1,3-propylene glycol, 1,4- and 2,3-butylene glycol, 1,6-hexanediol, 1,8-octanediol, neopentyl glycol, cyclohexane dimethanol, 2-methyl-1,3-propanediol, glycerol, trimethylolpropane, 1,2,6-hexanetriol, 1,2,4-butanetriol, pentaerythritol, mannitol, sorbitol, diethylene glycol, triethylene glycol, tetraethylene glycol, poly(ethyleneoxy) glycols generally, dipropylene glycol, poly(propyleneoxy) glycols generally, dibutylene glycol, poly(butyleneoxy) glycols generally, and the polymeric glycol from caprolactone, commonly known as polycaprolactone.

Other polyhydroxy materials of higher molecular weight which may be used as backbone polyols are polymerization products of epoxides, such as ethylene oxide, propylene oxide, butylene oxide, styrene oxide, and epichlorohydrin, with materials having reactive hydrogen compounds, such as water and, more particularly, alcohols, including ethylene glycol, 1,3- and 1,2-propylene glycol, trimethylolpropane, etc. Amino alcohols may be made by condensing amino-containing compounds with the foregoing epoxides, using such material such as ammonia, aniline, and ethylene diamine.

Hydroxyl-containing polyesters, polythioethers, polyacetals, polycarbonates, and polyester amides also may be used as backbone polyols instead of or together with the foregoing polyols. Suitable polyesters include the reaction product of polyhydric alcohols and polybasic, preferably dibasic, carboxylic acids. The polyhydric alcohols which are often used include the dihydric alcohols mentioned above. Examples of dicarboxylic acids include succinic acid, adipic acid, suberic acid, azelaic acid, sebacic acid, glutaric acid, phthalic acid, maleic acid, and fumaric acid. Hydroxyl-containing polythioethers, polyacetals, polycarbonates, and polyesteramides are less frequently employed in the preparation of RIM elastomers. However, these are sufficiently well known to those practicing the art that they need not be further elaborated upon here.

A major difference between the use of dihydric polyols and the higher polyols as backbone polyols is that the latter invariably give rise to crosslinking. That is, any polyol containing three or more hydroxyl groups in the molecule can effectively act as a crosslinking agent to form a three-dimensional network of chains in the resulting prepolymer, whereas use of a dihydric polyol will lead only to linear chains unless the polyisocyanate contains more than 2 isocyanate groups.

The polyamines which may be used for Type D prepolymer preparation will be referred to as "backbone polyamines". They are well known to those skilled in the art but will be mentioned here, though not in great detail, and include diamines, triamines, and possibly higher polyfunctional amines which are primary amines. One class of such amines is related to aminodiphenylmethane-ethers and esters of the formulae,

$H_2NC_6H_4CH_2C_6H_4NHC(O)-O-X-$
$-O-C-(O)NHC_6H_4CH_2C_6H_4NH_2,$

$H_2NC_6H_4CH_2C_6H_4NHC(O)-O-X-C-$
$(O)O-C-(O)NHC_6H_4CH_2C_6H_4NH_2,$

$H_2NC_6H_4CH_2C_6H_4NHC(O)-O-(O)C-X-$
$-C-(O)O-C(O)NHC_6H_4CH_2C_6H_4NH_2.$ In these compounds X is usually an alkylene group, an alkyleneoxy group, or a poly(alkyleneoxy) group. A similar set of backbone polyamines results from substitution of both $H_2NC_6H_4CH_2C_6H_4NHC(O)-$groups by $H_2NC_6H_3(CH_3)NHC(O)-$moieties.

Another class of backbone polyamines has the formula $H_2N-Y-NH_2$. In one group Y is an alkylene chain. In a larger group Y is a poly(alkyleneoxy) or a polyester moiety with an alkylene group at both termini. So, for example, in this group are amine-capped polyols which are the reaction product of a polyol and then an amine with alkylene oxides as well as amine-capped hydroxyl-containing polyesters. Materials of molecular weight in the 200–6000 range are most often utilized.

Tri- and higher polyamines of structures similar to those in the foregoing paragraph also may be utilized. For example, the reaction of pentaerythritol with an alkylene oxide will give a polyether product, one terminus of which has the structural unit

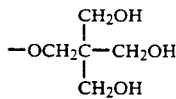

This can be amine-capped to give a triamine, and if the hydroxyl group at the other terminus is so capped there will result a tetraamine. Both kinds of products may be used as backbone polyamines.

We wish to emphasize that the foregoing enumerated polyamines are only exemplary of the backbone polyamines which may be used in the practice of our invention. It is well known to one skilled in the art that there is a wide choice of backbone polyamines available for polymer use, and since the point of departure of our invention from the prior art is the use of certain diamines as chain extenders it is unnecessary to elaborate further on the backbone polyamines, a subject well known to the skilled artisan.

The polyisocyanate reactants are then reacted (cured) with the diamines of our invention, bis(N-alkylaminocyclohexyl)methanes acting as a chain extender. Curing may be effected with a) our diamines alone or in conjunction with b) other polyamines or c) polyols. The structure of our chain extenders is

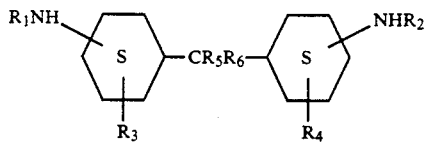

The groups $R_1$ and $R_2$ are alkyl groups, both linear and branched, each of which may contain from 1 up to about 10 carbon atoms. Although $R_1$ and $R_2$ need not be the same, in most cases they will be identical simply because of the convenience of their preparation. Representative alkyl groups include methyl, ethyl, propyl, isopropyl, butyl, isobutyl, secondary butyl, tertiary butyl, and the various isomeric pentyl, hexyl, heptyl, octyl, nonyl, and decyl groups. The preferred $R_1$ and $R_2$ contain at least three carbons, and the butyl group is particularly favored, and within the latter the sec-butyl group is greatly preferred.

$R_3$, $R_4$, $R_5$ and $R_6$ each are independently selected from the group consisting of hydrogen and alkyl groups containing from 1 up to about 5 carbon atoms, although in the most usual case $R_3$ and $R_4$ will be the same. The alkyl groups from which $R_3$, $R_4$, $R_5$ and $R_6$ may be chosen are identical with those mentioned for $R_1$ and $R_2$ except for the limitation that they contain no more than about 5 carbon atoms. The case where $R_5$ and $R_6$ are hydrogen is particularly favored. The cases where $R_3$ and $R_4$ are methyl or hydrogen and $R_5=R_6=H$ are especially preferred.

The bis(N-alkylaminocyclohexyl)methanes of this invention are represented such that the alkylamino group may be placed anywhere on the ring relative to the $CR_5R_6$ group, and the groups $R_3$ and $R_4$ may occupy any position relative to the alkylamino groups. Even though there is no limitation as to the relative positions of the alkylamino groups and $R_3$, $R_4$, that variant where the alkylamino groups are at the 4,4'-positions relative to the $CR_5R_6$ bridge is most common, and where $R_3$ and $R_4$ are alkyl groups it is most likely that they occupy the 3- and 3'-positions.

The polyisocyanate reactants are used at a level of from about 0.9 up to about 1.25 equivalents per equivalent of bis(N-alkylaminocyclohexyl)methane, which frequently is expressed as 90–125% polyisocyanate reactant. Most typically the polyisocyanate is used stoichiometrically or in slight excess of 5–15% over that required, i.e., the preferred range of polyisocyanate is 100–115% (1.00–1.15 equivalents per equivalent of our chain extender amine).

The polymers of our invention also may be formed by reacting from 0.9 up to about 1.25 equivalents of the polyisocyanate reactants with 1 equivalent of a blend of the foregoing secondary amines of our invention with backbone polyols (as previously defined) and polyols, in the case of monomeric polyisocyanates or quasi prepolymers, or with a blend of the foregoing secondary amines of our invention with polyols in the case of full prepolymers. The polyols used in this branch of our invention are polyhydric alcohols with more than two reactive hydroxyl groups per molecule, i.e., more than two hydroxyl groups per molecule must react with the terminal isocyanate groups of the polyisocyanate. Normally this means the polyols are at least trihydric, but since some trihydric alcohols may have one or more hydroxyl groups unreactive under the reaction conditions of curing, it is not invariably true that a trihydric alcohol will suffice. In particular, phenolic hydroxyl moieties, and hydroxyl groups attached to a tertiary carbon atom, usually will be unreactive in curing polyisocyanates, whereas the hydroxyl moiety associated with primary and secondary alcohols will be reactive. With the use of polyols having more than two reactive hydroxyls per molecule it is clear that such materials act as both crosslinkers and chain extenders. Among the polyols which may be used are included 1,1,1-tri(hydroxymethyl)propane, otherwise known as 2,2-di(hydroxymethyl)-1-butanol, 1,1,1-tri(hydroxymethyl)ethane, N,N,N',N'-tetrakis(2-hydroxypropyl)ethylene diamine, 2,4,6-tris(N-methyl-N-hydroxymethylaminomethyl)phenol, 1,2,6-hexanetriol, 1,2,4-butanetriol, pentaerythritol, mannitol, sorbitol, triglycols, castor oils, triisopropanolamine, and N,N,N'N'-tetrakis(hydroxyethyl)ethylene diamine. The polyols commonly are used at a level between about 0.10 and about 1.0 equivalents per equivalents of the diamines of our invention.

The polymers of our invention also may be formed by reacting from 0.9 up to about 1.25 equivalents of the polyisocyanate reactants with 1 equivalent of a blend of the foregoing secondary amines of our invention with backbone polyamines (as previously defined) and polyamines, in the case of monomeric polyisocyanates or quasi prepolymers, or with a blend of the foregoing secondary amines of our invention with polyamines in the case of full prepolymers. The polyamines used in this branch of our invention are polyfunctional amines with more than two reactive amine groups per molecule, i.e., more than two amine groups per molecule must react with the terminal isocyanate groups of the polyisocyanate. Normally this means the polyamines are at least trifunctional. Though a primary amine contains two hydrogens, the second hydrogen may be unreactive under the reaction conditions of curing. For example, reaction may not occur if the second hydrogen is too sterically hindered or the reaction temperature is not high enough. It is also possible that an entire amine group may be unreactive due to steric hindrance. With the use of polyamines having more than two reactive amine hydrogens per molecule it is clear that such materials act as both crosslinkers and chain extenders. Among the polyamines which may be used are included those previously defined as backbone polyamines where the molecular weight is 1000 and less, linear or branched alkyl diamines where the total number of carbons ranges from 2 to about 20, trifunctional linear or branched alkyl amines where the total number of carbons ranges from 5 to about 20, substituted amines such as tris(2-aminoethyl)amine, isophoronediamine, bis(aminocyclohexyl)methanes such as bis(4-aminocyclohexyl)methane and bis(4-amino-3-methylcyclohexyl)methane.

In another variation, the polymers may be made by reacting polyisocyanate reactants with polyisocyanate-reactive components where the secondary amines of our invention have been blended with backbone polyols and polyamines, or where the secondary amines of our invention have been blended with backbone polyamines and polyols.

The alkylated diamines of this invention typically are prepared by conventional alkylation procedures performed on the precursor primary amines, a representative of which may be found in the examples herein. The precursor primary amines are materials of commerce which are readily available and whose preparation need not be described here.

Cure time will depend not only on the type of alkyl groups on the diamine but also will depend on the amount and nature of other isocyanate-reactive materials if present in a cure blend. For example, in general it will be found that cure time as a function of $R_1$ and $R_2$ increases in the order R=primary alkyl<secondary alkyl<tertiary alkyl. In view of this it should be clear that the bis(N-alkylaminocyclohexyl)methanes of this invention can be expected to manifest an enormous range of cure time. This variability presents distinct advantages in permitting the end user to tailor the diamine to his particular needs. Since the properties of the resulting elastomer also will vary with the diamines of this invention, and since many diamines may be chosen with approximately the same cure time, the end user generally also will have a broad choice of our diamines depending upon the performance characteristics sought for the final product.

Where catalysts are needed to promote curing organic tin compounds are probably most frequently used and include such materials as the tin(II) salts of carboxylic acids such as tin(II) acetate, tin(II) octoate, tin(II) ethylhexoate and tin(II) laurate, as well as such materials as the dialkyl tin salts of carboxylic acids as exemplified by dibutyltindiacetate, dibutyltindilaurate, dibutyltinmaleate, and dioctyltindiacetate. Such tin salts may be used either alone or as a complex with amidines such as amino pyridines, amino pyrimidines, hydrazino pyridines, and tetrahydropyrimidines.

Catalysts based on metals such as lead, iron, mercury, bismuth, coblat and manganese also have been used, and include compounds such as cobalt(III) acetylacetonate, cobalt naphthoate, manganese naphthoate, lead oleate, bismuth neodecanoate, zinc naphthenate and zirconium naphthenate. Other catalysts which may be used include tertiary amines such as triethylamine, tributylamine, N-methylmorpholine, 1,4-diaza-bicyclo-(2,2,2)-octane, N-methyl-N'-dimethylaminoethylpiperazine, N,N-dimethylbenzylamine, N,N-dimethylcyclohexylamine, and 1,2-dimethylimidazole.

Other catalysts such as silaamines and basic nitrogen compounds such as tetraalkyl ammonium hydroxide, alkali metal hydroxides such as sodium hydroxide, and alkali metal alcoholates such as sodium methylate also have been used as catalysts. These catalysts are generally used in an amount from about 0.01 to about 10% by weight, preferably from about 0.05 to about 1.0% by weight, based on the quantity of polyisocyanate and the quantity of materials reacting with the polyisocyanate.

The following examples merely illustrate our invention and are not intended to limit it in any way. Procedures and materials are solely representative of those which can be employed, and are not exhaustive of those available and operative.

EXAMPLES

Preparation of the Polymers. The polymer formulations were prepared and mixed using the "one-shot" method, although methods based on the quasi prepolymer and the prepolymer also may be used. Preparation, mixing, and curing were carried out at room temperature. The B-side components (all of the isocyanate-reactive components, catalysts, and additives) were added to a paper cup and stirred for one minute. The stirrer paddle was left in the cup to minimize bubble formation and the B-side was degassed for 30 minutes to remove any bubbles or dissolved air. After degassing, the B-side was brought over to the high-torque stirrer, the stirring paddle was reconnected in the stirrer, and the A-side (isocyanate) quickly measured into the B-side. The mixture was stirred between 30 to 60 seconds, depending upon the pot life of the material, while being careful to minimize the formation of bubbles. The mixture was then either poured into stainless steel casting molds (⅛ inch depth), covered, and allowed to set up overnight or cast as thin films onto glass plates using a doctor blade set at about 33 mils. The stoichiometry of the curing agents was generally 100% of theoretical. The polymers were allowed to post-cure for two weeks at room temperature before testing.

The polymers were characterized using ASTM methods. Hardness was measured using ASTM Method D 2240, tear resistance using D 624, tear propagation resistance using D 1938, compression set using D 395, and resilience (Bashore rebound) using D 2632. Moduli, tensile strength, and elongation were measured using D 412.

Pot life is defined as the time when a string of the curing polymer can be pulled up about one inch using a glass rod and the string does not break for at least 10 seconds. Gel time was determined using a Gardner Gel Timer (Paul N. Gardner Company, Inc.). The tack free time is defined as the time when the polymer is completely free of tack.

Preparation of Chain Extender Amines, bis(N-sec-butyl-4-aminocyclohexyl)methane (diamine A) and bis(N-sec-butyl-4-amino-3-methylcyclohexyl)methane (diamine B). Diamine A was prepared by reductively alkylating di-(4-aminocyclohexyl)methane with methyl ethyl ketone (MEK) over a catalyst composed of 0.375% platinum on alumina with hydrogen present. The catalyst can be used as a powder, sized particles, or as 1/16 inch spheres, depending upon the reactor size and type. The reactors were pressurized with hydrogen. When the materials were prepared using a stirred autoclave, the pressures were between 1,000 and 1,500 psi and the reaction times between 5 and 8 hours. When prepared using a continuous, fixed-bed reactor, the pressure was maintained at about 800 psi and the feed rate was about 1 LHSV.

The temperature range which can be used in these reactions is between 100° and 140° C., with the preferred range between 100° and 120° C. The ratio of MEK to the amine can be from about 6 to 8 moles of MEK to 1 mole of amine. Upon completion of the reaction, the excess MEK and water are stripped from the reaction mixture leaving almost exclusively diamine. The water may also be removed from the reaction by the addition of a drying column at the end of the continuous reactor. The product is a clear, virtually colorless liquid. Diamine B was similarly prepared using di-(4-amino-3-methylcyclohexyl)methane as the starting amine with comparable results.

Polymers from diamine B, curing at ambient temperature. Diamine B was used at levels of 0-30 parts per hundred parts based on polyol. In this case, the hundred parts of polyol is the total amount of backbone polyols. The polyisocyanate was bis(4-isocyanatocyclohexyl)methane from Miles Laboratories available as Desmodur W ® and the backbone polyol was a mixture of the polymerization product of propylene oxide with propylene diol (Arcol ® PPG-1025) or glycerol (Arcol ® LG-168) available from ARCO Chemical Co. using as a catalyst dibutyltin dilaurate and a moisture scavenger of 3A molecular sieve in castor oil available as Unisiv 3A paste from UOP. Results are summarized in Table A.

TABLE A
ROOM TEMPERATURE-CURED POLYURETHANE COATINGS DIAMINE B LEVEL VERSUS PROPERTIES

| | | | | | | |
|---|---|---|---|---|---|---|
| Diamine B (php) | 0 | 10 | 15 | 20 | 25 | 30 |
| Desmodur W (Index) | 100 | 100 | 100 | 100 | 100 | 100 |
| ARCOL PPG-1025 (php) | 70 | 70 | 70 | 70 | 70 | 70 |
| ARCOL LG-168 (php) | 30 | 30 | 30 | 30 | 30 | 30 |
| Dibutyltin dilaurate | 0.1 | 0.1 | 0.1 | 0.1 | 0.1 | 0.1 |
| Unisiv 3A Paste (php) | 5 | 5 | 5 | 5 | 5 | 5 |
| Pot Life (m, h) | 3 h | 60 m | 18.5 m | 18.5 m | 10 m | 3.5 m |
| Gel Time (m, h) | | 1.4 h | 40 m | | | 24 m |
| Tack Free Time (h) | <168 | <54 | <31 | <21 | <19 | <16 |
| Hardness (Shore A) | 44 | 55 | 59 | 73 | 80 | 88 |
| Hardness (Shore D) | 11 | 15 | 17 | 24 | 26 | 41 |
| Tensile Str. (psi) | 320 | 611 | 1452 | 1575 | 2201 | 3009 |
| 100% Modulus (psi) | 203 | 178 | 268 | 434 | 640 | 1081 |
| 200% Modulus (psi) | — | 303 | 480 | 789 | 1067 | 1642 |
| 300% Modulus (psi) | — | 508 | 901 | 1472 | 1771 | 2612 |
| Elongation (%) | 181 | 331 | 355 | 307 | 332 | 324 |
| Tear Resist. (pli) | 69 | 94 | 121 | 149 | 191 | 253 |
| Tear Prop. Resist. (pli) | 7 | 17 | 29 | 46 | 66 | 101 |
| Resil., Vert. Rebnd (%) | 39 | 16 | 14 | 16 | 20 | 27 |
| Compression Set (%) | 4.6 | 56 | 71 | 79 | 87 | 91 |
| Shrinkage (%), | | | | | | |
| Day 1 | 0.52 | 0.36 | 0.48 | 0.32 | 0.29 | 0.26 |
| Day 14 | 0.42 | 0.36 | 0.48 | 0.32 | 0.29 | 0.26 |

This table shows the effect of diamine B level on the final properties of the polymers. The level of diamine B has been varied from 0 to 30 parts per hundred parts of polyol (php). The column on the left represents the standard formulation without any diamine B. Note that the pot life is quite long and that the tack free time is unusually long. The standard formulation produces a very soft material which has low tensile strength, low elongation, and low tear strengths. In general, the polymer exhibits poor toughness (note both low tensile strength and elongation).

Upon addition of diamine B, the process times begin to change. At 20 php diamine B, the polymer now has an overnight tack free time, which is important for an industrial coating such as for parking lots, roof coatings, etc. As the level of diamine B increases, one observes dramatic improvements in polymer toughness. For example, tensile strength increases from 320 psi to 3009 psi and elongation increases from 181% to 324%. Modulus and tear strength values also significantly improve with increasing diamine B level. In all cases, linear shrinkage (as measured in percent) is less than 0.5% for the diamine B-containing samples.

Polymers were prepared using other chain extenders replacing diamine B and their properties are shown in Table B, where 1,4-BD is 1,4-butanediol and PPG-425 is a polypropylene glycol of molecular weight about 425 available from ARCO Chemical Co.

TABLE B
ROOM TEMPERATURE-CURED POLYURETHANE COATINGS DIAMINE B VERSUS STANDARDS

| CURING AGENT | DIAMINE B | 1,4-BD | PPG-425 | None |
|---|---|---|---|---|
| Desmodur W (Index) | 100 | 100 | 100 | 100 |
| ARCOL PPG-1025 (php) | 70 | 70 | 70 | 70 |
| ARCOL LG-168 (php) | 30 | 30 | 30 | 30 |
| Diamine B (php) | 20 | | | |
| 1,4-Butanediaol (php) | | 5.14 | | |
| PPG-425 (php) | | | 24.33 | |
| Dibutyltin dilaurate | 0.1 | 0.1 | 0.1 | 0.1 |
| Unisiv 3A Paste (php) | 5 | 5 | 5 | 5 |
| Pot Life (m, h) | 18.5 m | 1.1 h | 2.2 h | 3 h |
| Gel Time (m,) | | 40 m | | |
| Tack Free Time (h) | <21 | <105 | <168 | <168 |
| Hardness (Shore A) | 73 | 68 | 49 | 44 |
| Hardness (Shore D) | 24 | 18 | 12 | 11 |
| Tensile Str. (psi) | 1575 | 768 | 397 | 320 |
| 100% Modulus (psi) | 434 | 329 | 186 | 203 |
| 200% Modulus (psi) | 789 | 470 | 308 | — |
| 300% Modulus (psi) | 1472 | 625 | — | — |
| Elongation (%) | 307 | 363 | 251 | 181 |
| Tear Resist. (pli) | 149 | 131 | 104 | 69 |
| Tear Prop. Resist. (pli) | 46 | 45 | 11 | 7 |
| Resil., Vert. Rebnd (%) | 16 | 29 | 22 | 39 |
| Compression Set (%) | 79 | 35 | 8.2 | 4.6 |
| Shrinkage (%). | | | | |
| Day 1 | 0.32 | 0.61 | 0.36 | 0.52 |
| Day 14 | 0.32 | 0.65 | 0.29 | 0.42 |

This table compares a diamine B-containing sample to the same formulation, but with the diamine B replaced with typical polyol curatives. The amount of polyol curatives used was identical to the number of equivalents of diamine B used and is expressed in php. As noted before, the process times of samples based on diamine B are more suitable for coatings, in that, an overnight cure was obtained with the diamine B sample, whereas, both of the controls required several days before a tack free material was obtained. The diamine B-containing sample significantly out-performed the polyol-cured standards. The sample containing 1,4-BD (1,4-butanediol) is the closest to diamine B in physical properties (note the similar hardness), but the diamine B sample still has a tensile strength more than twice that of the 1,4-BD sample. In addition, the diamine B sample exhibits higher modulus, comparable elongation (even with the dramatically higher tensile strength), and improved tear strengths. Again, the use of diamine B has led to the production of a significantly tougher material.

Crosslinking Studies. This series varies the level of the backbone triol ARCOL LG-168 to vary the cross-linking level on a polymer resulting from room temperature curing using diamine B, with results tabulated in Table C.

TABLE C
ROOM TEMPERATURE-CURED POLYURETHANE COATINGS DIAMINE B STUDY: CROSS-LINK LEVEL VERSUS PROPERTIES

| ARCOL LG-168 (php) | 0 | 15 | 33 | 50 | 67 | 85 | 100 |
|---|---|---|---|---|---|---|---|
| ARCOL PPG-1025 (php) | 100 | 85 | 67 | 50 | 33 | 15 | 0 |
| Desmodur W (Index) | 100 | 100 | 100 | 100 | 100 | 100 | 100 |
| DIAMINE B (php) | 20 | 20 | 20 | 20 | 20 | 20 | 20 |
| Dibutyltin dilaurate | 0.1 | 0.1 | 0.1 | 0.1 | 0.1 | 0.1 | 0.1 |
| Unisiv 3A Paste (php) | 5 | 5 | 5 | 5 | 5 | 5 | 5 |
| Pot Life (m) | 20 | 16 | 15 | 22 | 15 | 15 | 23 |
| Gel Time (m) | 57 | 41 | 34 | 49 | 30 | 31 | 58 |
| Tack Free Time (h) | 25 | 19 | 18 | <66 | <65 | <19 | <19 |
| Hardness (Shore A) | 62 | 61 | 73 | 77 | 82 | 88 | 91 |
| Hardness (Shore D) | 18 | 18 | 24 | 27 | 31 | 37 | 41 |
| Tensile Str. (psi) | 226 | 1526 | 2091 | 2164 | 2222 | 2199 | 2924 |
| 100% Modulus (psi) | 138 | 248 | 435 | 623 | 869 | 1127 | 1512 |
| 200% Modulus (psi) | 173 | 392 | 786 | 1332 | — | — | — |
| 300% Modulus (psi) | 198 | 564 | 1436 | — | — | — | — |
| Elongation (%) | 1081 | 534 | 342 | 250 | 194 | 160 | 156 |
| Tear Resist. (pli) | 113 | 135 | 153 | 151 | 144 | 153 | 163 |
| Tear Prop. Resist. (pli) | 83 | 71 | 46 | 39 | 44 | 45 | 51 |
| Resil., Vert. Rebnd (%) | 18 | 16 | 17 | 17 | 19 | 23 | 29 |
| Compression Set (%) | mlt | 92 | 78 | 62 | 48 | 34 | 31 |
| Shrinkage (%). | | | | | | | |
| Day 1 | 0.32 | 0.52 | 0.36 | 0.36 | 0.48 | 0.32 | 0.48 |
| Day 14 | 0.39 | 0.42 | 0.26 | 0.16 | 0.32 | 0.48 | 0.42 |

Tables A and B show that the use of diamine B may lead to increases in compression set values if the addition of diamine B is not also coupled with an increase in cross-linking. Table C shows the effect of increased cross-linking on the physical properties of polymers made using diamine B. The cross-linking was introduced by using the triol ARCOL LG-168, which was varied from 0 to 100 php. The diamine B level was kept constant.

The process times of all of the samples were similar; hence, changing the cross-linking level had little effect on the pot life or tack free times within the uncertainty of the measurements. As expected, as the level of cross-linking increased, the compression set values decreased (improved). The sample with no triol led to a thermoplastic polymer, and the polymer based on 100% triol had a compression set value of 31%. Due to the large size of the triol, even 100% triol leads to only a moderate level of cross-link density. This is evidenced by the hardness of the polymer at 100% triol being only 91 Shore A and the elongation still being over 150%. Increasing the level of cross-linking led to significant improvements in tensile strength and modulus with the expected trade off in elongation. As observed before, the polymers using diamine B showed good resistance to shrinkage.

Polymer properties varying diamines and isocyanate. In this series using diamine A and diamine B polymers were prepared from various isocyanates and polyols. VORANOL® 234-630 is a polyether triol, average molecular weight 267, available from Dow chemical U.S.A. Dabco T-12 is a trade name of American Cyanamid for dibutyltin dilaurate.

TABLE D
ROOM TEMPERATURE-CURED POLYURETHANE COATINGS DIAMINES A & B STUDY: ISOCYANATE TYPE VERSUS PROPERTIES

| Method | Cast | Cast | Cast | Film | Film | Cast | Cast |
|---|---|---|---|---|---|---|---|
| Isocyanate (Index = 100) | Des W | Des W | Des W | Des Z | Des Z | TM XDI | Des W |
| ARCOL LG-168 (php) | | | | 30 | 100 | 100 | 100 |
| ARCOL PPG-1025 (php) | 100 | 100 | 100 | 70 | | | |
| Voranol 234-630 (php) | 5 | 10 | 15 | | | | |
| Diamine B (php) | 20 | 20 | 20 | 20 | 20 | | |
| Diamine A (php) | | | | | | 18.4 | 18.4 |

TABLE D-continued
ROOM TEMPERATURE-CURED POLYURETHANE COATINGS DIAMINES A & B STUDY: ISOCYANATE TYPE VERSUS PROPERTIES

| Method | Cast | Cast | Cast | Film | Film | Cast | Cast |
|---|---|---|---|---|---|---|---|
| Dibutyltin dilaurate | 0.1 | 0.1 | 0.1 | 0.1 | 0.1 | 0.1 | 0.1 |
| Unisiv 3A Paste (php) | 5 | 5 | 5 | 5 | 5 | 5 | 5 |
| Pot Life (m) | 16 | 29 | 20 | 3 | 6 | 36 | 31 |
| Gel Time (m) | >40 | 84 | 35 | 56 | 16 | 66 | 48 |
| Tack Free Time (h) | <88 | <67 | <66 | 3 | 2.8 | >43 | 25 |
| Hardness (Shore A) | 69 | 80 | 85 | 95 | 94 | 57 | 88 |
| Hardness (Shore D) | 23 | 29 | 34 | 58 | 58 | 16 | 39 |
| Tensile Str. (psi) | 1606 | 2023 | 1741 | 2957 | 3058 | 541 | 1146 |
| 100% Modulus (psi) | 283 | 490 | 714 | 2466 | — | 282 | — |
| 200% Modulus (psi) | 435 | 832 | 1299 | — | — | — | — |
| 300% Modulus (psi) | 624 | 1468 | — | — | — | — | — |
| Elongation (%) | 517 | 337 | 238 | 107 | 64 | 179 | 79 |
| Tear Resist. (pli) | 154 | 196 | 195 | 303 | 339 | 81 | 106 |
| Tear Prop. Resist. (pli) | 88 | 67 | 62 | 39 | 48 | 15 | 35 |
| Resil., Vert. Rebnd (%) | 17 | 20 | 24 | — | 30 | 5 | 23 |
| Compression Set (%) | 86 | 84 | 76 | — | 102 | 78 | 63 |
| Shrinkage (%), | | | | | | | |
| Day 1 | 0.36 | 0.45 | 0.32 | — | — | 0.42 | 0.52 |
| Day 14 | 0.26 | 0.32 | 0.29 | — | — | 0.26 | 0.42 |

Table D illustrates the use of diamines A and B with different types of aliphatic isocyanates. Both mold casting and film drawing methods were used in the table. Des W is Desmodur W, Des Z is Desmodur Z-4370/2 (trimers of isophorone diisocyanate, 70% solids), both from Miles Laboratories, and TMXDI is meta-tetramethylxylylene diisocyanate from American Cyanamid Co. The first five polymers use diamine B as the curative and the last two polymers are based on diamine A. All of the formulations produced good materials. Those based on Des Z typically produce materials which are harder than those based on either Des W or TMXDI. The formulation using 100% of the triol ARCOL LG-168 with Des W and 20 php diamine B produced a film with a tensile strength of over 3,000 psi and a tear resistance of about 340 pli.

Polyurea polymers; diamine A. In this study the backbone polyamines were chosen from the Jeffamine® series available from Texaco Chemical Co. The polyamines of the Jeffamine T series are amine-capped polymerization products of propylene oxide with glycerol (in the case of T-5000). The trifunctional T-5000 has an approximate molecular weight of 5,000. The Jeffamine D series compounds are poly(propyleneoxy)diamines, i.e., the reaction products of ammonia with propylene oxide with both termini amine-capped. D-2000 is a diamine with an approximate molecular weight of 2,000. The polymer results are summarized in Table E.

TABLE E
ROOM TEMPERATURE-CURED POLYUREA COATINGS DIAMINE A STUDY: Diamine A/JEFFAMINE RATIO (BY EQUIVALENT)

| Diamine A/Jeffamine X 100 | 0 | 70 | 85 | 100 | 115 | 130 |
|---|---|---|---|---|---|---|
| TMXDI (Index) | 100 | 100 | 100 | 100 | 100 | 100 |
| Jeff D-2000 (php) | 80 | 80 | 80 | 80 | 80 | 80 |
| Jeff T-5000 (php) | 20 | 20 | 20 | 20 | 20 | 20 |
| Diamine A (php) | — | 9.8 | 11.9 | 14.1 | 16.2 | 81.3 |
| Unisiv 3A Paste (%) | 5 | 5 | 5 | 5 | 5 | 5 |
| Pot Life (m) | <9 s | 2.7 | 2.9 | 2.9 | 3.0 | 3.0 |
| Gel Time (m) | | ND | ND | ND | 3.7 | 4.5 |
| Tack Free Time (m) | | 13 | 17 | 19 | 17.5 | 18.5 |
| Hardness (Shore A) | | 78 | 81 | 83 | 82 | 86 |
| Hardness (Shore D) | | 24 | 26 | 25 | 24 | 29 |
| Tensile Str. (psi) | | 544 | 630 | 600 | 688 | 615 |
| 100% Modulus (psi) | | 500 | 597 | 568 | 660 | 587 |
| 200% Modulus (psi) | | 540 | 629 | 597 | 684 | 612 |
| 300% Modulus (psi) | | 541 | 617 | 581 | 661 | 591 |
| Elongation (%) | | 400 | 365 | 385 | 440 | 407 |
| Tear Resist. (pli) | | 146 | 171 | 172 | 182 | 191 |
| Tear Prop. Resist. (pli) | | 102 | 126 | 129 | 157 | 155 |
| Resil., Vert. Rebnd (%) | | 41 | 37 | 33 | 28 | 29 |
| Shrinkage (%), | | | | | | |
| Day 1 | | 0.30 | 0.30 | 0.20 | 0.10 | 0.10 |
| Day 14 | | 0.30 | 0.40 | 0.40 | 0.60 | 0.30 |

ND = Not determined.

Table E demonstrates the use of diamine A with polyurea coatings based on the isocyanate TMXDI and Jeffamine polyamines as the backbone. The diamine A level is studied as a function of the diamine A/Jeffamine ratio and this ratio is based on the number of equivalents of each. The most important information in the table is that of the control formulation. The run with no diamine A, reacts much too quickly to even be usable for coatings using standard casting equipment. The pot life of the control, which is less than 9 seconds, requires the use of specialized mixing and dispensing equipment-typically based on RIM (reaction injection molding) technology. The use of diamine A drastically slows down the reaction increasing the pot life from less than 9 seconds to about 3 minutes. With the use of diamine A in the formulation, it is possible to prepare polyurea coatings using typical casting and dispensing equipment.

In general, the polyurea coatings made using diamine A led to good materials with tensile strength values above 600 psi and elongation values around 400%. Tear strength values, an important characteristic for coatings, were generally above 170 pli for tear resistance and above 130 pli for tear propagation resistance. Interestingly, the physical properties were relatively constant over the diamine A range studied. These coatings also have good shrink resistance.

Polyurea polymers; diamine B. This is similar to the foregoing study except that diamine B was employed.

TABLE F
ROOM TEMPERATURE-CURED POLYUREA COATINGS DIAMINE B STUDY: Diamine B/JEFFAMINE RATIO (BY EQUIVALENT)

| Diamine B/Jeffamine X 100 | 0 | 70 | 85 | 100 | 115 | 130 |
|---|---|---|---|---|---|---|
| Desmodur W (Index) | 100 | 100 | 100 | 100 | 100 | 100 |
| Jeff D-2000 (php) | 80 | 80 | 80 | 80 | 80 | 80 |
| Jeff T-5000 (php) | 20 | 20 | 20 | 20 | 20 | 20 |
| Diamine B (php) | — | 10.7 | 13.0 | 15.3 | 17.6 | 19.9 |
| Unisiv 3A Paste (%) | 5 | 5 | 5 | 5 | 5 | 5 |
| Pot Life (m) | <9 s | 2.7 | 3.2 | 2.9 | 3.2 | 3.2 |
| Gel Time (m) | | 22 | 22 | 17 | 18 | 20 |
| Tack Free Time (m) | | 110 | 150 | 150 | 117 | 98 |
| Hardness (Shore A) | | 52 | 63 | 71 | 77 | 85 |
| Hardness (Shore D) | | 12 | 15 | 19 | 22 | 28 |
| Tensile Str. (psi) | | 386 | 536 | 649 | 787 | 934 |
| 100% Modulus (psi) | | 185 | 294 | 403 | 535 | 653 |
| 200% Modulus (psi) | | 258 | 395 | 513 | 647 | 761 |
| 300% Modulus (psi) | | 309 | 458 | 580 | 717 | 835 |
| Elongation (%) | | 1025 | 790 | 730 | 525 | 610 |
| Tear Resist. (pli) | | 125 | 164 | 204 | 201 | 290 |
| Tear Prop. Resist. (pli) | | 116 | 152 | 176 | 221 | 265 |
| Resil., Vert. Rebnd (%) | | 35 | 34 | 33 | 36 | 40 |
| Shrinkage (%), | | | | | | |
| Day 1 | | 0.30 | 0.20 | 0.20 | 0.40 | 0.40 |

TABLE F-continued

ROOM TEMPERATURE-CURED POLYUREA COATINGS DIAMINE B STUDY: Diamine B/ JEFFAMINE RATIO (BY EQUIVALENT)

| | | | | | |
|---|---|---|---|---|---|
| Day 14 | 0.30 | 0.20 | 0.20 | 0.40 | 0.30 |

This table represents a study identical to that in Table E except diamine B is used and the isocyanate is Desmodur W. As in Table E, the control formulation (without our invention) is too fast to be usable in conventional casting and dispensing equipment. Though the pot lives of the formulations in Table F are similar to those of Table E, it must be remembered that Desmodur W is a faster-reacting isocyanate than TMXDI. This fact helps illustrate the difference in reactivity between diamine A and diamine B amines. For the faster-reacting Desmodur W-Jeffamine system, the use of the slower reacting diamine B is preferred if one wants to have pot lives of about 3 minutes or more. Note that the gel time (working time) and tack free times for the formulations in Table F are significantly longer than those in Table E.

The formulations in Table F show a steady increase in tensile strength, modulus, and tear strengths as the level of diamine B increases. The elongation values are very high, ranging from 525% (at a tensile strength of 787 psi) up to 1025% (at a tensile strength of 386 psi). The formulation using the highest level of diamine B (hardness of 85 Shore A) had a tensile strength of 934 psi, an elongation value of 610%, a tear resistance of 290 pli, and a tear propagation resistance of 265 pli.

Polyurea polymers; effect of backbone. The study varies the backbone polyamine and compares the properties of the resulting polymer for diamine A in Table G and diamine B in Table H.

TABLE G

ROOM TEMPERATURE-CURED POLYUREA COATINGS DIAMINE A STUDY: EFFECT OF BACKBONE CROSS-LINKING

| % Jeff T-5000 (By php) | 10 | 20 | 30 | 40 | 50 |
|---|---|---|---|---|---|
| TMXDI (Index) | 100 | 100 | 100 | 100 | 100 |
| Jeff D-2000 (php) | 90 | 80 | 70 | 60 | 50 |
| Jeff T-5000 (php) | 10 | 20 | 30 | 40 | 50 |
| Diamine A (php) | 14.8 | 14.1 | 13.3 | 12.6 | 11.9 |
| Unisiv 3A Paste (%) | 5 | 5 | 5 | 5 | 5 |
| Pot Life (m) | 2.3 | 2.3 | 2.1 | 2.3 | 2.3 |
| Gel Time (m) | 3.8 | 3.5 | 3.3 | 3.0 | 3.0 |
| Tack Free Time (m) | 8.0 | 8.1 | 11.8 | 7.0 | 7.3 |
| Hardness (Shore A) | 83 | 81 | 80 | 81 | 78 |
| Hardness (Shore D) | 25 | 23 | 22 | 23 | 22 |
| Tensile Str. (psi) | 617 | 600 | 600 | 678 | 811 |
| 100% Modulus (psi) | 604 | 575 | 563 | 539 | 522 |
| 200% Modulus (psi) | 607 | 597 | 594 | 584 | 578 |
| 300% Modulus (psi) | 573 | 584 | 596 | 601 | 598 |
| Elongation (%) | 302 | 414 | 565 | 900 | 1370 |
| Tear Resist. (pli) | 165 | 170 | 220 | 249 | 243 |
| Tear Prop. Resist. (pli) | 110 | 120 | 176 | 249 | 200 |
| Resil., Vert. Rebnd (%) | 33 | 36 | 34 | 33 | 35 |
| Shrinkage (%). | | | | | |
| Day 1 | 0.36 | 0.42 | 0.36 | 0.39 | 0.29 |
| Day 14 | 0.32 | 0.42 | 0.29 | 0.39 | 0.36 |

Table G studies the effect increased cross-linking has on the physical properties of the finished polymers based on diamine A. The cross-linking is added via the trifunctional Jeffamine T-5000 and is described as the percent of Jeffamine T-5000 in the total amount of Jeffamines used expressed as parts per hundred parts of polyamine (php). Due to the high molecular weight of Jeffamine T-5000 (about 5000), even 100% T-5000 produces only a moderate level of cross-link density. By changing the cross-linking level, one can tailor the properties of the finished polymer with only slight effects on the hardness. Note that at 50% Jeffamine T-5000, one obtains a 78 Shore A coating with a tensile strength of 811 psi, an elongation value of 1,370%, and a tear resistance of 243 pli.

TABLE H

ROOM TEMPERATURE-CURED POLYUREA COATINGS DIAMINE B STUDY: EFFECT OF BACKBONE CROSS-LINKING

| % Jeff T-5000 (By php) | 10 | 20 | 30 | 40 | 50 |
|---|---|---|---|---|---|
| Desmodur W (Index) | 100 | 100 | 100 | 100 | 100 |
| Jeff D-2000 (php) | 90 | 80 | 70 | 60 | 50 |
| Jeff T-5000 (php) | 10 | 20 | 30 | 40 | 50 |
| Diamine B (php) | 16.1 | 15.3 | 14.5 | 13.8 | 13.0 |
| UniSiv 3A Paste (%) | 5 | 5 | 5 | 5 | 5 |
| Pot Life (m) | 3.9 | 4.5 | 5.1 | 4.5 | 4.9 |
| Gel Time (m) | 12.5 | 17.0 | 22.0 | 14.3 | 16.0 |
| Tack Free Time (m) | 78 | 90 | 78 | 108 | 114 |
| Hardness (Shore A) | 76 | 73 | 72 | 70 | 69 |
| Hardness (Shore D) | 22 | 21 | 20 | 19 | 19 |
| Tensile Str. (psi) | 623 | 633 | 626 | 767 | 911 |
| 100% Modulus (psi) | 409 | 396 | 358 | 371 | 349 |
| 200% Modulus (psi) | 514 | 504 | 472 | 494 | 474 |
| 300% Modulus (psi) | 574 | 569 | 544 | 576 | 560 |
| Elongation (%) | 705 | 770 | 800 | 970 | 980 |
| Tear Resist. (pli) | 202 | 201 | 209 | 220 | 218 |
| Tear Prop. Resist. (pli) | 177 | 173 | 209 | 179 | 197 |
| Resil., Vert. Rebnd (%) | 38 | 37 | 36 | 40 | 41 |
| Shrinkage (%). | | | | | |
| Day 1 | 0.52 | 0.29 | 0.52 | 0.36 | 0.55 |
| Day 14 | 0.52 | 0.26 | 0.45 | 0.36 | 0.45 |

Table H is a study identical to that of Table G, but Desmodur W and diamine B are used in the place of TMXDI and diamine A. Physical property trends similar to those of Table G were observed. Again, it is important to remember that the difference in reactivity between diamine A and diamine B allow the fabricator greater control of processing times and also more selection of formulation components; for example, Desmodur W versus TMXDI.

TABLE I

Comparative polyurea coatings. ROOM TEMPERATURE-CURED POLYUREA COATINGS DIAMINES A & B AMINES COMPARED TO TEXACO EXAMPLE

| Aliphatic Amine | DIAMINE A | TEXACO | DIAMINE B |
|---|---|---|---|
| TMXDI (Index) | 100 | Prepolym | |
| Desmodur W (Index) | | | 100 |
| Jeffamine D-2000 (php) | 50 | Mix | 50 |
| Jeffamine T-3000 (php) | 50 | Mix | 50 |
| Diamine A (php) | 12 | | |
| Diamine B (php) | | | 13 |
| Uniiv 3A Paste (%) | 5 | | 5 |
| Reaction Temp (°C.) | RT | 66 | RT |
| Pot Life (m) | 2.3 | — | 4.9 |
| Gel Time (m) | 3.0 | 3 sec | 16 |
| Tack Free Time (m) | 7.3 | — | 114 |
| Hardness (Shore A) | 78 | 90 | 69 |
| Hardness (Shore D) | 22 | 39 | 19 |
| Tensile Str. (psi) | 811 | 969 | 911 |
| 100% Modulus (psi) | 522 | — | 349 |
| 200% Modulus (psi) | 578 | — | 474 |
| 300% Modulus (psi) | 598 | — | 560 |
| Elongation (%) | 1368 | 425 | 979 |
| Tear Resist. (pli) | 243 | 210 | 218 |
| Tear Prop. Resist. (pli) | 200 | — | 197 |
| Resil., Vert. Rebnd (%) | 35 | — | 41 |
| Compression Set (%) | 102 | — | 95 |
| Shrinkage (%). | | | |

TABLE I-continued

Comparative polyurea coatings.
ROOM TEMPERATURE-CURED POLYUREA
COATINGS DIAMINES A & B AMINES COMPARED
TO TEXACO EXAMPLE

| Aliphatic Amine | DIAMINE A | TEXACO | DIAMINE B |
|---|---|---|---|
| Day 1 | 0.29 | — | 0.55 |
| Day 14 | 0.36 | — | 0.45 |

This table I compares an example of a diamine A-based and a diamine B-based coating to one by Texaco which appeared in the literature (D. J. Primeaux, *32nd Annual Polyurethane Technical/Marketing conference*, Oct. 1–4, 1989.) Please note that though we use the Texaco formulation for comparison purposes, we are not claiming that our formulations selected for the comparison function as drop-in replacements for that of Texaco. They are different systems and may show different physical properties under other conditions. The Texaco formulation is a polyurea spray system and uses a TMXDI-based prepolymer made with Jeffamine polyamines. Our formulations illustrated are based on the "one-shot", quasi prepolymer, or prepolymer methods and can be used with conventional equipment as well as with RIM-based equipment.

The major point to be made in the table is that the Texaco formulation is processed at 66° C., whereas both the diamine A and diamine B-based formulations are processed at room temperature. The gel time of the Texaco formulation is 3 seconds whereas that of the diamine A formulation is 3 minutes and that of the diamine B formulation is 16 minutes. The hardness values of the three formulations are not identical, but they are close enough to permit a rough comparison of polymer toughness.

The formulations based on our inventions have tensile strengths and tear strengths similar to the Texaco polymer, but the elongation values of our polymers are drastically higher. The diamine B-based polymer's elongation value is 130% higher and that of the diamine A-based polymer is over 220% higher than the Texaco material.

What is claimed is:

1. A process for preparing a polymer comprising reacting from about 0.9 to about 1.25 equivalents of a polyisocyanate reactant or mixture of polyisocyanate reactants with one equivalent of compounds having isocyanate-reactive hydrogens selected from the group consisting of 1) first polyamines, 2) blends of said first polyamines with polyols, 3) blends of said first polyamines with second polyamines, and 4) blends of said first polyamines with polyols and second polyamines, said first polyamines having the structure

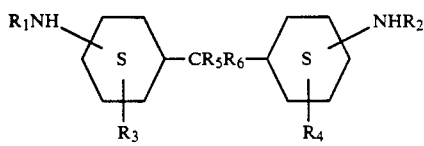

where $R_1$ and $R_2$ are independently selected from the group consisting of alkyl groups with from 1 up to about 10 carbon atoms, and $R_3$, $R_4$, $R_5$ and $R_6$ are independently selected from the group consisting of hydrogen and alkyl groups with from 1 up to about 5 carbon atoms.

2. The process of claim 1 where the polyisocyanate reactant is a monomeric polyisocyanate.

3. The process of claim 1 where the polyisocyanate reactant is an isocyanate-terminated prepolymer.

4. The process of claim 1 where $R_5$ and $R_6$ each are hydrogen.

5. The process of claim 1 where $R_3$ and $R_4$ each are hydrogen.

6. The process of claim 1 where $R_3$ and $R_4$ each are methyl groups.

7. The process of claim 1 where $R_1$ and $R_2$ each are butyl groups.

8. The process of claim 7 where $R_1$ and $R_2$ each are sec-butyl groups.

9. The process of claim 1 where $R_1$ and $R_2$ each are sec-butyl groups $R_5$ and $R_6$ each are hydrogen, and $R_3 = R_4$ and are selected from the group consisting of hydrogen and methyl.

10. As a composition of matter, bis(N-alkylaminocyclohexyl)methanes having the structure

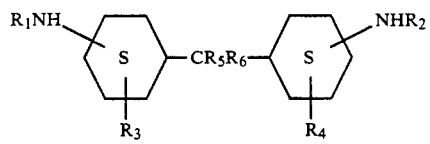

where $R_1$ and $R_2$ are independently selected from the group consisting of alkyl groups with from 1 up to about 10 carbon atoms, and $R_3$, $R_4$, $R_5$ and $R_6$ are independently selected from the group consisting of hydrogen and alkyl groups with from 1 to about 5 carbon atoms.

11. The composition of matter of claim 10 where $R_1$ and $R_2$ each are alkyl groups containing at least three carbon atoms.

12. The composition of matter of claim 11 where $R_1$ and $R_2$ each are butyl groups.

13. The composition of matter of claim 12 where $R_1$ and $R_2$ each are sec-butyl groups.

14. The composition of matter of claim 10 where $R_3$ and $R_4$ each are hydrogen.

15. The composition of matter of claim 10 where $R_3$ and $R_4$ each are methyl.

16. The composition of matter of claim 10 where $R_5$ and $R_6$ each are hydrogen.

17. The composition of matter of claim 10 where $R_1 = R_2 =$ butyl, $R_3 = R_4 =$ H or $CH_3$, and $R_5 = R_6 =$ H.

18. A polymer resulting from the reaction of from about 0.9 to about 1.25 equivalents of a polyisocyanate reactant or mixture of polyisocyanate reactants with one equivalent of compounds having isocyanate-reactive hydrogens selected from the group consisting of 1) first polyamines, 2) blends of said first polyamines with polyols, 3) blends of said first polyamines with second polyamines, and 4) blends of said first polyamines with polyols and second polyamines, said first polyamines having the structure

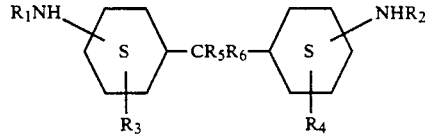

where $R_1$ and $R_2$ are independently selected from the group consisting of alkyl groups with from 1 up to about 10 carbon atoms, and $R_3$, $R_4$, $R_5$ and $R_6$ are independently selected from the group consisting of hydrogen and alkyl groups with from 1 up to about 5 carbon atoms.

19. The process of claim 18 where the polyisocyanate reactant is a monomeric polyisocyanate.

20. The process of claim 18 where the polyisocyanate reactant is an isocyanate-terminated prepolymer.

21. The process of claim 18 where $R_5$ and $R_6$ each are hydrogen.

22. The process of claim 18 where $R_3$ and $R_4$ each are hydrogen.

23. The process of claim 18 where $R_3$ and $R_4$ each are methyl groups.

24. The process of claim 18 where $R_1$ and $R_2$ each are butyl groups.

25. The process of claim 24 where $R_1$ and $R_2$ each are sec-butyl groups.

26. The process of claim 18 where $R_1$ and $R_2$ each are sec-butyl groups $R_5$ and $R_6$ each are hydrogen, and $R_3=R_4$ and are selected from the group consisting of hydrogen and methyl.

* * * * *